Figure 1:
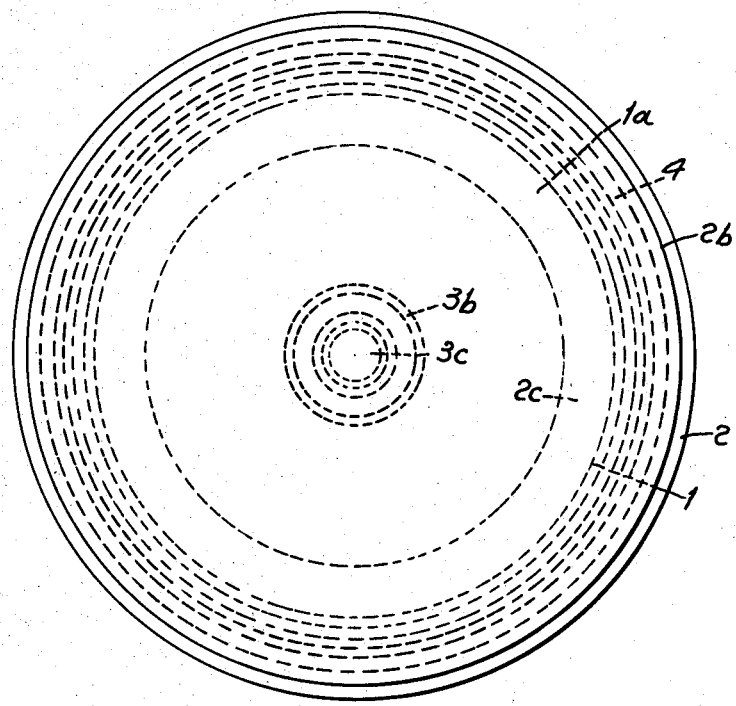

Aug. 11, 1964

D. K. COLES 3,144,569

THERMIONIC CONVERTER

Filed July 7, 1960

INVENTOR.
DONALD K. COLES
BY
Philip M. Bolton
ATTORNEY though the converter shown uses solar heat as its source of heat energy, any other suitable heat source may also be utilized.

United States Patent Office 3,144,569
Patented Aug. 11, 1964

3,144,569
THERMIONIC CONVERTER
Donald K. Coles, Fort Wayne, Ind., assignor to International Telephone and Telegraph Corporation, Nutley, N.J., a corporation of Maryland
Filed July 7, 1960, Ser. No. 41,314
12 Claims. (Cl. 310—4)

The present invention refers to thermionic converters, and more particularly to a thermionic converter wherin critical cathode to anode spacing is controlled during the converter operation.

It is generally recognized that the efficiency of a vacuum thermionic converter will be seriously reduced by the presence of space charge in the gap between the hot cathode and the anode. The space charge effect, which results from the electrons emitted from the cathode, is an obstacle which must be overcome before it is possible to construct any efficient thermionic converter.

One of the known solutions to the problem of space charge reduction, the procedure of constructing converters with extremely close cathode to anode spacing, has proved to be impractical due to expansion of electrode materials, warping, disintegration, etc., over the operating life. Another attempted solution to the space charge problem has been to include a gas within the converter envelope such that the space charge is partially compensated by positively charged cesium ions. These gas filled converters partially solve the space charge problem, but they introduce problems of their own which necessarily reduce their efficiency below that obtainable in principle from a vacuum converter with an extremely close spacing.

An object of the present invention is to provide an improved, high efficiency thermionic converter.

Another object of the present invention is to provide a thermionic converter wherein the cathode to anode spacing is controlled during operating condition.

A further object of the present invention is to provide a thermionic converter wherein the probability of a cathode to anode short circuit is reduced.

A feature of the present invention is the provision of a thermionic energy converter comprising a thermionic cathode in coactive relation with a source of heat energy, an anode having a surface thereof spaced a given distance from the cathode, and means for causing a subliming metal to precipitate on the anode surface, including a source of subliming metal communicating with the anode surface.

Another feature of the present invention is a thermionic energy converter of the type described wherein the subliming metal is located within the anode and is caused to sublime in response to the heat therefrom.

Figure 2:
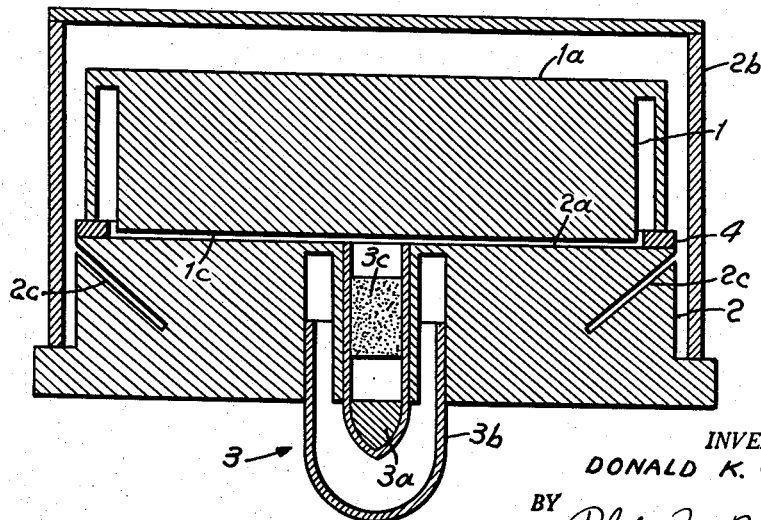

The above-mentioned and other features and objects of this invention will become more apparent by reference to the following description taken in conjunction with the accompanying drawings, in which:

FIG. 1 is a plan view of an embodiment of a thermionic converter following the principles of the present invention and, FIG. 2 is a cross-sectional elevation view of the converter of FIG. 1.

Referring to FIG. 2, a thermionic energy converter is shown comprising a thermionic cathode 1 in coactive relation to a source of heat energy, an anode 2, having a surface 2a thereof spaced a given distance from cathode 1, and means 3 for causing a subliming metal to precipitate on anode surface 2a, including a source of subliming metal 3a communicating with anode surface 2a.

Although thermionic converters are adaptable to many forms of heat energy, the particular embodiment for purposes of explanation, is shown as designed to operate with solar heat. Surface 1a of cathode 1 is exposed to the heat energy and electrons are emitted from the opposite surface 1c by the phenomenon known as the thermionic emission. Anode 2 is located in the path of the emitted electrons and the electrons which reach the anode, charge it negatively. The space between cathode surface 1c and anode surface 2a is preferably evacuated and the electrons, in crossing the vacuum, constitute an electrical current which may be utilized by a suitable load device coupled in circuit arrangement with cathode 1 and anode 2.

A serious limitation of efficiency in thermionic converters occurs when the electrons, as they travel from the cathode to the anode, build up a collective negatively charged cloud, generally called "space charge," which repels and inhibits the emission of new electrons from the cathode and thereby reduces the amount of current flow and the over-all efficiency of the converter.

Heretofore it has been known that the limitation on converter power conversion efficiency brought about by the space charge barrier can be made arbitrarily small by suffiently reducing the anode-to-cathode spacing to the order of 0.01 mm. or better. Hilary Moss, in an article entitled "Thermionic Diodes of Energy Converters," beginning on page 305 of the January 1957 issue of the Journal of Electronics, states that close cathode to anode spacing will improve efficiency but such a solution is impractical because of the difficulty "of achieving the corresponding degrees of permanent flatness and smoothness which alone make such a spacing have a definite meaning." The difficulty is due to the thermal expansion and warping of the cathode and anode which occur during operation. Since the manner and degree in which the cathode and anode will expand and warp is almost impossible to predetermine, the problem becomes one of maintaining a constant uniform, extremely small cathode-to-anode planar spacing despite variations in the spacing due to expansion and warping, whenever and wherever the said variations occur over the cathode or anode surface.

In the converter shown, surface 1c of cathode 1, which is preferably constructed of tungsten, is initially spaced from surface 2a of anode 2, which may be constructed of tantalum, by an order of spacing greater than that required for optimum efficiency. A ceramic ring 4 is used to insulate and space anode 2 from cathode 1. A source of subliming metal 3a is provided so as to be responsive to the heat of anode 2, and is preferably disposed in a centrally located depression 3 as shown. If the converter is operated in its upright position the subliming metal will be held in the depression by the force of gravity, however in many instances the converter may not be maintained upright, so a porous plug 3c is provided to hold the metal in place. Plug 3c may be made from sintered material such as tungsten; nickel; tantalum; molybdenum, so that it will hold the metal preferably in its interstices within depression 3, by means of surface tension, but as the metal is sublimed it will pass through to surface 2a. When heat is applied to cathode 1 from the heat source, it will be radiated to anode 2. A reflective heat barrier 2b completely surrounds the outer edge of the anode as shown, and impedes the exit of heat therefrom. A conical slot 2c in anode 2 functions to direct the anode heat inward so the heat distribution will be greater at the extreme outer edge of the anode so that metal will not precipitate there and short circuit the insulator ring 4. Another reflective heat barrier 3b is provided to enclose depression 3, and thereby aid in maintaining it as the hottest portion of the anode. The concentrated heat at source 3a causes the metal to sublime out and precipitate on planar surface 2a, which is the coolest accessible portion of the anode. The subliming metal will continue to precipitate on surface 2a, the metallic build up thereby causing a decrease in the cathode-to-anode spacing. As the cathode to anode spacing decreases the emission current will increase since the criteria for maximum efficiency is being approached. The smaller the spacing the more the efficiency will improve as the space charge effects are reduced, until a final spacing is approached, as described below, at which no further precipitation is possible, this final spacing being well within the limits required for efficient operation.

For a converter as described, with a cathode temperature in the range between 1000° C. and 2500° C., an anode temperature in the range between 400° C. and 1000° C., or even cooler, and a spacing of 0.01 inch, the initial current density will be almost zero. As the spacing becomes less than 0.0005 due to the precipitating metal, the current density will increase to approximately 0.4 ampere per square centimeter of cathode surface and the heating due to the electron flow will be of the order of 0.5 watt per square centimeter. This heat will be sufficient to begin raising the temperature of surface 2a of anode 2, which is now coated with subliming metal in solid form, and begin to slow down the precipitation rate. Eventually, as the cathode to anode spacing reaches the order of .0001 inch, the heat due to the electron flow will raise the temperature of the subliming metal surface to the point where the metal will resublime and not come in contact with the cathode surface, and a spacing in the order of .0001 inch will be maintained between the cathode and anode. This spacing, as stated hereinabove will provide high efficiency power conversion due to reduced space charge effects.

An important advantage of the present invention is that if the spacing tends to become non-uniform, those areas of the coated anode that are closest to the cathode will tend to be hottest, so that more of the subliming metal will be resublimed from these areas and the rate of diminution of the gap at these areas will be slowed. This is because the thermal conductance of the tantalum anode with its layer of subliming metal will be insufficient to equalize the temperature difference by conductance between even a 1 square millimeter area of close spacing and the rest of the anode. Thus, when a small anode surface area approaches within 0.0001 inch of the cathode it will stop until all the rest of the anode surface has also closed to this spacing. The cathode to anode spacing will not be reduced in the area above the depression in the anode where the source of subliming metal is located, and consequently the current density at this point will be negligible due to the large spacing and the space charge limitation, and resultingly the heat at depression 3 will eventually be no greater than the rest of the anode and the transport of the subliming metal will cease.

If, due to operating conditions etc., the surface of the cathode, or the tantalum surface of the anode should vary and change their shape and spacing due to warping or expansion, the surface areas of the anode of the points where the spacing has increased or decreased due to such variation will become respectively relatively cooler or hotter. If the spacing has decreased the increased heat from the now more proximate cathode will resublime the metal on the anode at that area, thereby maintaining the uniform spacing. Likewise, if the spacing has increased, more metal will precipitate at the now more cooler area, also maintaining the uniform spacing. It is seen therefore that not only does the present invention provide a means for obtaining a minimal uniform cathode to anode spacing, but also the means to insure that the spacing will remain uniform during spacing changes which may occur during operation.

Another advantage of the present invention is that damaging cathode to anode short circuits are prevented since the subliming metal surface of the anode is never permitted to build up to the point of contact with the cathode due to the cathode heat. However, if for some reason the subliming metal does come in contact with the cathode, the immensely hotter cathode will instantly vaporize away the point of contact before any short circuit damage could occur.

A still further advantage gained by the present invention is that since the working surface of the anode will be the subliming metal, the anode material may be selected for its thermal conductivity properties, either tantalum as shown, or copper.

When the operation of the converter is halted and it cools down uniformly the cathode-to-anode spacing will remain approximately the same, but, if for some reason it is desired to return the subliming metal to central depression 3, radiation shield 3b may be removed and the depression will become the coldest part of the anode, and the subliming metal will then sublime back to its original soure 3a.

Several possible subliming metals which may be employed in the present invention are listed in the following Table 1, together with their temperatures corresponding to four different sublimation pressures, ($10^{-5}$ mm. to $10^{-2}$ mm.) and the corresponding rates of evaporation measured in microns per minute. These data are mostly taken from S. Dushman's book "Vacuum Techniques" (Wiley, 1949). Most of these metals will have a beneficial effect on the thermionic work function of the anode and cathode.

Table 1

| Pressure | | $10^{-5}$ mm. | $10^{-4}$ mm. | $10^{-3}$ mm. | $10^{-2}$ mm. | Tm. |
|---|---|---|---|---|---|---|
| Metal: | | | | | | |
| Cadmium | T | 148 | 180 | 220 | 264 | 321 |
| | S | 0.021 | 0.20 | 1.9 | 18.5 | |
| Zinc | T | 211 | 248 | 292 | 343 | 419 |
| | S | 0.018 | 0.17 | 1.7 | 16 | |
| Magnesium | T | 287 | 331 | 383 | 443 | 651 |
| | S | 0.042 | 0.40 | 3.9 | 37 | |
| Strontium | T | 361 | 413 | 475 | 549 | 800 |
| | S | 0.050 | 0.48 | 4.6 | 44 | |
| Barium | T | 418 | 476 | 546 | 629 | 800 |
| | S | 0.045 | 0.43 | 4.1 | 39 | |
| Calcium | T | 408 | 463 | 528 | 605 | 810 |
| | S | 0.055 | 0.53 | 5.1 | 48 | |
| Silver | T | 767 | 848 | 963 | 1,047 | 961 |
| | S | 0.011 | 0.10 | 1.0 | 9.5 | |
| Copper | T | 946 | 1,035 | 1,141 | 1,273 | 1,083 |
| | S | 0.009 | 0.086 | 0.83 | 7.9 | |
| Manganese | T | 717 | 791 | 878 | 980 | 1,260 |
| | S | 0.011 | 0.11 | 1.0 | 10 | |

T is the temperature in degrees C. corresponding to the vapor pressures in the table.
S is the speed of evaporation in microns per minute.

While I have described the space between the anode and cathode as initially being a vacuum, a suitable vapor, such as cesium and the like may be employed instead. Other changes using the principle of my invention will readily occur to those versed in the art. Accordingly, while I have described above the principles of my invention in connection with specific apparatus, it is to be clearly understood that this description is made only by way of example and not as a limitation to the scope of my invention as set forth in the objects thereof and in the accompanying claims.

I claim:

1. A thermionic energy converter adapted to convert heat directly into an electrical current comprising a thermionic cathode in coactive relation with and directly heated by heat from a source of heat energy and radiating a percentage of said heat, an anode having a surface thereof closely spaced a given distance from said cathode and receptive to said heat radiated therefrom, said anode having a depression in the central portion thereof, means positioned on said anode to cause said central portion thereof to be relatively hotter than said surface thereof, and a source of subliming metal located within said anode depression, said metal subliming in response to the heat thereat and precipitating on said relatively cooler anode surface to form a layer which varies in accordance with the distance between adjacent areas of said cathode and anode and inversely with the temperatures on said anode surface to maintain a substantially uniform effective spacing between said anode and cathode, said layer occupying the major portion of the distance therebetween.

2. A thermionic energy converter according to claim 1 including a porous plug positioned in said depression to hold said subliming metal by means of surface tension.

3. A thermionic energy converter adapted to convert heat directly into an electrical current comprising a thermionic cathode adapted to be directly heated by heat from a heat source, an anode having a surface closely positioned at a given distance from said cathode and receptive to heat radiated therefrom, a source of subliming metal having means communicating with said anode surface, and means directing heat from said anode onto said source of metal to cause said metal to sublime and precipitate on said anode surface and form a variable layer which occupies a substantial portion of said distance and maintains a substantially uniform effective spacing between said anode and cathode.

4. The device of claim 3 wherein said heat source is external to said converter.

5. The device of claim 4 wherein said layer varies in accordance with the distance between adjacent areas of said anode and cathode and inversely with the temperatures on said anode surface.

6. The device of claim 5 wherein said layer occupies the major portion of said distance between said anode and cathode.

7. The device of claim 5 wherein said means directing said heat includes means for cooling said source of metal and causing said metal to sublime back to said source.

8. The device of claim 5 wherein the space between said anode and cathode comprises a vacuum.

9. The device of claim 5 wherein the space between said anode and cathode includes a cesium vapor.

10. The device of claim 6 wherein said distance between anode and cathode is in the order of .01 inch and the optimum effective spacing therebetween is in the order of .0001 inch.

11. The device of claim 6 wherein said subliming metal is of a type selected from the group consisting of cadmium, zinc, magnesium, strontium, barium, calcium, silver, copper and manganese.

12. The device of claim 6 wherein said heat directing means is positioned on said anode and includes a heat barrier mounted to maintain said heat upon said anode.

References Cited in the file of this patent
UNITED STATES PATENTS

| | | |
|---|---|---|
| 1,714,403 | Smith | May 21, 1929 |
| 1,961,814 | Charlton | June 5, 1934 |
| 2,422,427 | Louden | June 17, 1947 |
| 2,581,446 | Robinson | Jan. 8, 1952 |